United States Patent [19]

Coldrey et al.

[11] 3,909,249

[45] Sept. 30, 1975

[54] PROCESS OF SELECTIVELY RECOVERING NICKEL AND COBALT

[75] Inventors: Peter Wallace Coldrey, North Balwyn; John Barrington Glen, Armadele, both of Australia

[73] Assignee: ICI Australia Limited, Melbourne, Australia

[22] Filed: Nov. 1, 1974

[21] Appl. No.: 520,641

[30] Foreign Application Priority Data

Nov. 14, 1973 Australia.............................. 5646/73

[52] U.S. Cl. ........................... 75/119; 75/82; 75/113
[51] Int. Cl.$^2$......................................... C22B 23/00
[58] Field of Search......................... 75/82, 113, 119

[56] References Cited
UNITED STATES PATENTS

| | | | |
|---|---|---|---|
| 3,232,750 | 2/1966 | Wesolowski et al. ................. | 75/113 |
| 3,318,689 | 5/1967 | Zubryckyj et al. .................... | 75/119 |
| 3,503,735 | 3/1970 | Beggs et al.............................. | 75/82 |

FOREIGN PATENTS OR APPLICATIONS

| | | | |
|---|---|---|---|
| 434,897 | 9/1935 | United Kingdom.................. | 75/113 |

*Primary Examiner*—C. Lovell
*Assistant Examiner*—M. J. Andrews
*Attorney, Agent, or Firm*—Cushman, Darby & Cushman

[57] ABSTRACT

Process for extracting cobalt and nickel from oxidized nickel ores containing between 0.5–5% w/w nickel, 5–30% w/w iron, 1.0–25% w/w magnesium and minor amounts of cobalt which process comprising firstly selectively reducing the ore so that substantially all the nickel and cobalt values are reduced to metal but substantially all the iron remains as oxide; secondly, treating the reduced ore with a mixture of hydrogen chloride and steam at a temperature in the range 150 to 500°C and at a volume ratio of steam to hydrogen chloride in the range 1:2 to 15:1 preferably 2:1 to 12:1 and, thirdly, leaching the nickel and cobalt values from the reduced ore with an aqueous leaching solution.

6 Claims, No Drawings

PROCESS OF SELECTIVELY RECOVERING NICKEL AND COBALT

The present invention relates to a process for recovering the nickel and cobalt values from nickeliferrous ores and more particularly to an improved process for recovering cobalt and nickel form ores of the silicate, oxide and partially or fully oxidized sulphide type, such as nickel laterites, and nickel rich serpentinite, that contain not only nickel and cobalt but other metal values such as iron, magnesium, calcium, manganese, copper, aluminum or chromium to a greater or lesser extent.

The prior art contains many proposals for the extraction of nickel and cobalt from these ores, such as for example processes which involve direct acid leaching of the raw ore, smelting to ferronickel, sulphating, chloridizing and, after preliminary reduction, leaching with acid, or ammoniacal solution, chloridizing, and extraction with carbon monoxide. Most of these proposals lead to processes which suffer from unduly high costs, the causes being one or more of such factors as low nickel and cobalt extractions, inability to handle an ore with widely varying composition, use of large quantities of expensive reagents, pressurisation of the reactants, batch operation, and problems with equipment corrosion.

It is the object of the present invention to provide an improved process for recovering nickel and cobalt, in high yields, from non-sulphide nickel ores, e.g. nickeliferrous laterites and nickel rich serpentinite.

Another object of the invention is to provide a porcess which selectively extracts a major proportion of the nickel and cobalt from the ore while simultaneously extracting only minor quantities of other metal values including iron, magnesium, calcium, chromium, manganese, aluminum and silicon which may also be present in the ore.

In the process for extracting cobalt and nickel from oxidized nickel ores containing between 0.5–5% w/w nickel, 5–30% w/w iron, 1.0–25% w/w magnesium and minor amounts of cobalt which process comprisinng firstly selectively reducing the ore so that substantially all the nickel and cobalt values are reduced to metal but substantially all the iron remains as oxide; secondly, treating the reduced ore with a mixture of hydrogen chloride and steam at a temperature in the range 150° to 500°C and at a volume ratio of steam to hydrogen chloride in the range 1:2 to 15:1 preferably 2:1 to 12:1 and, thirdly, leaching the nickel and cobalt values from the reduced ore with an aqueous leaching solution.

The oxidized nickel ferrous ores may also comprise quantities of aluminum, calcium, manganese, copper and other metal values which may be associated with oxidized nickeliferrous ores.

The ore used in our process may be either used without pretreatment or more usually the ores may be pretreated by any of the ore preparation operations known to those skilled in the art. These operations include drying, comminution, beneficiation and pelletisation. The first stage of our process consists of subjecting the ore, optionally pretreated, to a reductive roast, carried out at elevated temperature and at atmospheric pressure, in which substantially all of the nickel and cobalt values in the ore are reduced to the metal, whereas substantially all the iron remains in an oxidized form.

Following this reduction step the ore is cooled, under conditions such that the ore is not reoxidized, to a temperature in the range 150°–500°C, after which it is subjected to treatment with a gaseous mixture of steam and hydrogen chloride at about atmospheric pressure, in which the volume ratio of steam to hydrogen chloride of the gas fed to the reactor is in the range 1:2 to 15:1, preferably 2:1 to 15:1. In certain circumstances it may be beneficial to add a minor proportion of oxygen and/or an inert gas to the steam/hydrogen chloride mixture.

The nickel and cobalt values contained in the ore are converted to water soluble chlorides, whereas the other metals values such as iron, magnesium, aluminium, manganese and chromium remain in a water insoluble oxidized form to an extent determined by the characteristics of the ore, and the reduction and hydrochlorination conditions.

The chloridized ore is treated by mixing with an aqueous solution which extracts the nickel and cobalt chlorides and leaves the metal oxides and gangue material as an insoluble residue which can be removed by filtration. We prefer water as a solvent, the quantity being sufficient to ensure that the nickel and cobalt chlorides are almost completely removed from the solids, without forming excessively dilute solutions which make the eventual recovery of nickel and cobalt more expensive. Alternatively the metal chlorides may be removed from the ore by volatilisation if the ore temperature is increased.

The pregnant solution obtained from the leaching operation may be treated in any manner known to those skilled in the art for the separation of nickel and cobalt from admixture with other metals. Suitable processes are for example acidifying with hydrogen chloride and removing iron, copper and cobalt from solution by ion exchange and precipitating nickel chloride crystals which in turn are reduced to nickel metal as disclosed by the Falconbridge Nickel Company in their U.S. Pat. No. 902,413. Alternatively, the nickel may be precipitated out of the solution by cementation with an appropriate metal, or it may be recovered by solvent extraction or ion exchange, or by precipitation in alkaline solution, by other means as is appropriate to the physical form and purity required for the metal products, the supply of reagents, and the value of the by-products produced.

We have found that for a particular set of conditions for the chloridizing treatment i.e. for a particular steam to hydrogen chloride ratio, a particular temperature and a particular chloridizing time, there exists and optimum set of reducing conditions. The optimun reducing conditions for any particular chloridizing condition may be found by suitable experiment. Suitable reductants for use in the reduction stage have been found to be carbon monoxide, hydrogen, and the products formed in the combustion of coal and heavy fuel oils. Combination of the reductants mentioned above are also possible. The use of coal as reductant has the advantage that the temperature at which the reduction step is carried out is not as critical as when $CO/CO_2$ mixtures are used and that for a given nickel extraction a higher steam/HCl ratio can be used in the chloridizing step of the process.

We have found by experiment that for the preferred steam/hydrogen chloride ratios the optimum reducing conditions are, a temperature within the range 600°–900°C, a reducing environment equivalent to a carbon monoxide to carbon dioxide ratio in the range 3:1 to 1:5 by volume, and a solids residence time in the range 0.5–6 hours depending on the pressure within the reactor. The pressure for convenience is normally about one atmosphere absolute. In a further embodiment of our invention the reduction and chlorination are carried out in the same vessel.

We have found that using coal, selective reduction may be achieved at temperatures between 700°C and 850°C whereas when using $CO/CO_2$ mixture the reduction temperature should preferably be in a range 775° to 825°C.

The method of mixing the coal with the ore is not critical. Typical methods of adding the coal are given below:

1. Granulating crushed ore and mixing the granules with crushed coal.
2. Mixing crushed coal and ore and granulating the mix.
3. Granulating the ore and adding coal lumps to the bottom of the granule bed or adding coal lumps to the top of the granule bed and using a purge stream to take the volatile, reducing matter down through the granule bed.

We have found that the granule size has little effect on the nickel and iron extractions although slightly higher extractions are achieved with smaller granules.

The amount of coal added to the ore in the reduction stage also affects the iron and nickel extractions achieved. Increasing the amount of coal added increases both the iron and nickel extractions, however, the rate of increase in nickel extraction is less than the rate of increase in iron extraction. The optimum amount of coal required bearing in mind increased nickel extraction, increased iron extraction and the coal cost varies from ore to ore but can be determined by simple experiments. We prefer to add an amount of coal equal to between 2–25% of the dry weight of the ore and preferably between 5–12%.

The selectively reduced ore may be either cooled in an oxygen free atmosphere or alternatively the ore may be cooled by addition of cold hydrogen chloride and/or water mixtures as vapour or liquid in suitable quantities to achieve cooling of the ore, as well as providing some or all of the hydrogen chloride/steam required for reaction. in the hydrochlorination stage.

We have found that, with the nickel and cobalt values in the reduced form, high conversions of these two metals to the chlorides can be achieved by a steam/hydrogen chloride treatment where the steam to hydrogen chloride ratio is much greater than that which yields a comparable conversion when the nickel and cobalt is in the form originally present in the ore. This discovery has two important and economically significant consequences. They are:

1. The formation of chlorides from any metal values remaining in an oxidized form after the controlled pre-reduction step can be suppressed to a much greater extent than previously possible. This is of particular relevance to the amount of magnesium converted to the chloride because with low steam to hydrogen chloride volume ratios, less than 2:1, significant proportions of magnesium are converted to water soluble chlorides, however, as the hydrogen chloride to steam volume ratio increases above 5:1 when treating the reduced ore, the amounts of magnesium converted to the water soluble chloride is substantially reduced and is usually less than 5% of the amount originally contained in the ore.

2. The hydrogen chloride/steam mixture introduced to this reactor may contain significant quantities of acid of concentration approximately that of the constant boiling mixture, from hereon called the axeotrope acid. This acid may be obtained, fro example, from operations carried out at a later stage in the process such as nickel recovery from nickel chloride, hydrolysis of unwanted metal chlorides formed in the reactor and scrubbing trace hydrogen chloride from vent gas streams, without the expense of concentrating the liquid acid stream obtained from hydrogen chloride gas scrubbers. The exact ratio of hydrogen chloride/steam required in the feed to the reactor is achieved by addition of fresh hydrogen chloride, chlorine, chlorine/hydrogen mixture or steam as required to the azeotrope acid. The process has the advantage that the only major waste products are gangue material, metallic oxide and calcium chloride and the recovery of the chloride values does not require new technology.

We therefore prefer to use steam/hydrogen chloride volume ratios in the range from 2:1 to 12:1 in the chloridizing stage.

It has been found that, by subjecting oxidized nickeliferrous ores to the treatment described in the present invention, high percentage extractions of nickel and cobalt can be obtained from a variety of ores, or an ore with a widely differing reactivity, without simultaneously extracting significant quantities of other metal values including, in particular, iron, magnesium and chromium. Because of this fact additionally we have found that the initial amount of the principal impurities magnesium and iron have little effect on the impurity level in the nickel rich aqueous solution obtained as a result of treating an oxidized nickeliferrous ore by the process of the present invention, so the process herein described can be used to extract nickel from a wide variety of oxidized nickel ores and is particularly suited to ore bodies where the nickel values in the ore are contained in both minerals having a high percentage of magnesium and minerals having a high percentage of iron, and where the ratio of these minerals varies throughout the ore body.

The invention is illustrated by, but by no means limited to, the following examples.

EXAMPLE 1

The reaction vessel used for the experiments consisted of a horizontally located silica tube, 2 cm in diameter and 20 cm long. A sample of oxidized nickel ore having the composition shown in Table 1 was crushed to −100 BSS mesh and granulated with water to the size range −10 to +36 BSS mesh. 25 grams of the granulated ore was secured in the reactor with quartz wool plugs and heat was applied by means of an electrical tube furnace. A mixture of carbon monoxide and carbon dioxide in which the ratio of carbon monoxide to carbon dioxide was 0.5:1 (by volume) was passed through the ore sample for 1 hour while the ore temperature was maintained at 800°C. After this treatment the ore was allowed to cool to 400°C and once this temperature was reached the carbon dioxide/carbon monoxide mixture was replaced by a mixture of steam and hydrogen chloride in which the steam to hydrogen chloride volume ratio was 2.6:1. The treatment with the steam/hydrogen chloride mixture was maintained for 1 hour at 400°C after which time the ore was cooled in air and leached with water. The total amount of hydrogen chloride passed through the ore sample was in excess of the stoichiometric amount required to convert the nickel and iron values in the ore to their respective chlorides. The solution resulting from the aqueous leaching operation was analyzed for nickel, iron and magnesium and the amount of these metal values present in solution, expressed as a percentage of the quantities originally present in the ore are included in Table 2.

TABLE 1

| | | |
|---|---|---|
| Ni | = | 1.6% |
| Fe | = | 8.9% |
| Mg | = | 1.6% |
| Co | = | 0.06% |
| Cr | = | 3.7% |

TABLE 2

| Metal Value | % Extraction |
|---|---|
| Ni | 92 |
| Fe | 13 |
| Mg | 2 |
| Co | 85 |

EXAMPLE 2

A 25 gram sample of ore having the anaylsis shown in Table 1, was mixed with two grams of good coking coal. This mixture was then treated in the same apparatus as described in Example 1 for 270 minutes at 700°C. After this treatment the temperature controller for the apparatus was set to 400°C. When the ore had reached a temperature of 400°C a gaseous mixture of steam and hydrogen chloride in which the steam to hydrogen chloride ratio was 6.6:1 was passed through the ore sample for 45 minutes. The reacted sample was then leached and the resultant aqueous solution was determined for nickel iron and magnesium as described in Example 1. The extractions achieved are shown in Table 3.

TABLE 3

| Metal Value | % Extraction |
|---|---|
| Ni | 85 |
| Fe | 18 |
| Mg | 1.0 |

EXAMPLE 3

Example 1 was repeated except that the ore sample had the composition shown below:
Ni = 1.4%
Fe = 8.5%
Mg = 1.6%
Ca = 3.6%
Cr = 3.7%
Co = 0.06%
The extractions achieved are shown in Table 4.

TABLE 4

| Metal Value | % Extraction |
|---|---|
| Ni | 86 |
| Fe | 15 |
| Mg | 2 |
| Ca | 29 |

EXAMPLE 4

A 25 gram sample of ore having the composition shown in Table 1 was treated in the same apparatus as described in Example 1. The sample was heated to 400°C and then reacted for 1 hour with a steam/hydrogen chloride mixture in which the steam to hydrogen chloride ratio was 0.9:1 (by volume). The reacted ore sample was then leached with water and the resultant aqueous solution was determined for nickel, iron and magnesium as described in Example 1. The extractions achieved are shown in Table 5.

TABLE 5

| Metal Value | % Extraction Ex. 4 | Ex. 5 | Ex. 6 |
|---|---|---|---|
| Ni | 19 | 22 | 6 |
| Fe | 5 | 15 | 2 |
| Mg | 1 | 2 | 0.5 |

EXAMPLE 5

Similar to Example 4 except that the reaction temperature was 300°C. The extractions achieved are shown in Table 5.

EXAMPLE 6

Similar to Example 4 except that the steam to HCl ratio was 5.2 to 1 (by volume). The extractions achieved are shown in Table 5.

EXAMPLE 7

A 150 grams sample of ore having the compositions shown in Table 6 was treated in an apparatus similar to Example 1 except that it was capable of holding larger ore samples. 24 grams of crushed, good quality coking coal was mixed with the ore granules and the

TABLE 6

| | | |
|---|---|---|
| Ni | = | 1.7% |
| Fe | = | 11.4% |
| Mg | = | 14.3% | mixture was then heated to 825°C and held at this temperature for 3 hours the system was allowed to cool (as in Example 2) to 450°C at which temperature it was reacted for 60 minutes with a steam/HCl mixture in which the steam to HCl ratio was 1.7/1. The reacted sample as leached with water and the aqueous solution was analysed for nickel iron and magnesium as described in Example 1. The extractions achieved are shown in Table 7.

TABLE 7

| Metal Value | % Extraction |
|---|---|
| Ni | 86 |
| Fe | 33 |
| Mg | 1.5 |

EXAMPLE 8

An ore similar to that used in Example 7 was treated in an apparatus similar to that described in Example 1. 2 grams of coal were mixed with 25 grams of granulated ore and heated to 850°C at which temperature it was held for 3 hours. The samples was allowed to cool to 450°C (as in Example 2) at which temperature it was reacted for 45 minutes with a steam/HCl mixture in which the steam to HCl ratio was 4.1/1. The reacted sample was leached with water and the resultant solution determined for nickel iron and magnesium as in Example 1. The extractions achieved are shown in Table 8.

TABLE 8

| Metal Value | % Extraction |
|---|---|
| Ni | 73 |
| Fe | 14 |
| Mg | 1.1 |

EXAMPLE 9

A 25 gram sample of ore having the composition shown in Table 1 was mixed with 2 gram of coal and treated in the apparatus described in Example 1. The sample was heated to 725°C and held at this temperature for 120 minutes. It was then allowed to cool to 400°C (as in Example 2) at which temperature it was reacted for 45 minutes with a steam/HCl mixture in the range from 2.4:1 to 3.4:1 v/v ratio of steam to heat. The reacted sample was leached with water and the resultant solution determined for iron and nickel as in Example 1.

This experiment was repeated for various granule sizes, the steam/HCl ratio for all these runs being held in the range 2.4–3.4 v/v. The results obtained are shown in Table 9.

TABLE 9

| Granule Size (mm) | Extractions % Ni | Fe |
|---|---|---|
| 0.9 – 1.7 | 80.0 | 29.0 |
| 1.7 – 2.8 | 98.1 | 31.2 |
| 2.8 – 4.5 | 95.2 | 28.8 |
| 4.5 – 6.5 | 92.6 | 30.6 |
| 6.5 – 8.5 | 86 | 25.6 |
| 8.5 – 11.5 | 75.5 | 19.3 |
| 13 – 16 | 81.2 | 22.3 |

EXAMPLE 10

Coal was added to granules of ore having the composition shown in Table 1 and these samples were leached in an apparatus similar to that described in Example 7. Other conditions and procedures were similar to those described in Example 2 except for the means of coal addition, the quantity of coal added and the steam/HCl ratio. Three different methods of adding coal were investigated. These were:

1. Addition of coal lumps to the top of a bed of ore granules.
2. Addition of coal lumps to the bottom of a bed of ore granules.
3. Mixing finely crushed coal (<100 $\mu$) intimately with ore granules. The nickel and iron extractions obtained after leaching the reacted ore with water were determined as in Example 1 and are included in Table 10.

TABLE 10

| Details of pretreatment | Extractions % Ni | Fe |
|---|---|---|
| 10% coal in 3 lumps on top of vertical ore bed, N$_2$ was passed through bed during pre reduction (steam/HCl ratio 2.4:1 v/v) | 84.5 | 32 |
| 16% coal in 4 lumps at bottom of vertical ore bed (steam/HCl ratio 4.6:1 v/v) | 81.5 | 15 |
| 16% coal well mixed (steam/HCl ratio 5.0:1 v/v) | 80.1 | 27.3 |

EXAMPLE 11

25 gram samples of ore were treated in the same apparatus as described in Example 1 and the only parameter varied for a series of runs was the quantity of coal added to the ore. Runs in which 0.5 gram, 1.0 gram, 2.0 gram and 4.0 gram of coal was added to 25 grams of ore granules were made and the resultant nickel and iron extraction compared.

With 2 and 4 grams of added coal the nickel extractions achieved were within 2%. With 1 gram of added coal the nickel extraction achieved was only 87% of the extraction achieved with 4 grams of added coal. With 0.5 gram of added coal the nickel extraction achieved was 73% of the extraction achieved with 4 grams of added coal. The corresponding iron extractions decreased linearly as the surround of added coal was decreased. The iron extraction with 0.5 gram of added coal was 78% of the extraction achieved with 4 grams of added coal.

EXAMPLE 12

25 gram samples of ore were treated in the same apparatus as described in Example 1. A series of runs in which a mixture of CO/CO$_2$ was used to reduce the ore was made and all parameters were held constant with the exception of reduction temperature. The nickel extraction achieved in the reduction temperature range 775°–825°C were within 2%. The extractions achieved with a reduction temperature of 725°C and 875°C were 85% and 88% respectively of the extraction achieved at 800°C. The corresponding iron extractions decreased linearly with reduction temperature and the extraction at 875°C was 39% that obtained with a reduction temperature of 725°C.

A similar series of runs was made in which coal was used as the reducing agent instead of CO/CO$_2$ mixtures. In the range in reduction temperatures from 725° to 850°C the nickel extract achieved remained constant within 2%. The corresponding iron extraction decreased linearly and the value at 850°C was 76% the extraction achieved at 725°C. Beneath 720°C and above 870°C the iron and nickel extractions achieved decreased rapidly.

We claim:

1. A process for extracting cobalt and nickel from oxidized nickel ores containing between 0.5–5% nickel, 5–30% iron, 1.0–25% w/w magnesium and minor amounts of cobalt, which process comprises firstly, selectively treating the ore with a reducing agent under reducing conditions so that substantially all the nickel and cobalt values are reduced to metal but substantially all the iron and magnesium remain as oxide secondly, treating the reduced ore with a mixture of hydrogen chloride and steam at a temperature in the range from 150° to 500°C and at a volume ratio of steam to hydrogen chloride in the range from 1:2 to 15:1 whereby the nickel and cobalt values contained in the ore are converted to water soluble chlorides and the iron and magnesium values remain in a water insoluble oxidized form and, thirdly, leaching the nickel and cobalt values from the reduced ore with an aqueous leaching solution.

2. A process according to claim 1 wherein the volume ratio of steam to hydrogen chloride is in the ratio from 2:1 to 12:1.

3. A process according to claim 1 wherein the reducing agent is a mixture of carbon monoxide and carbon-dioxide having a volume ratio of $CO:CO_2$ in the range from 3:1 to 1:5, and the reduction temperature is in the range from 775°C to 825°C.

4. A process according to claim 1 wherein the reducing agent is coal and the reduction temperature is in the range from 700°C to 850°C.

5. A process according to claim 4 wherein the amount of coal used is in the range from 2 to 25% of the dry weight of the ore.

6. A process according to claim 5 wherein the amount of coal used is in the range from 5 to 12%.

* * * * *